(12) United States Patent
Hanyuda

(10) Patent No.: US 12,346,122 B2
(45) Date of Patent: Jul. 1, 2025

(54) INFORMATION PROCESSING APPARATUS AND INFORMATION PROCESSING METHOD

(71) Applicant: SONY GROUP CORPORATION, Tokyo (JP)

(72) Inventor: Makoto Hanyuda, Tokyo (JP)

(73) Assignee: SONY GROUP CORPORATION, Kanagawa (JP)

( * ) Notice: Subject to any disclaimer, the term of this patent is extended or adjusted under 35 U.S.C. 154(b) by 249 days.

(21) Appl. No.: 18/003,365

(22) PCT Filed: Jun. 10, 2021

(86) PCT No.: PCT/JP2021/022191
§ 371 (c)(1),
(2) Date: Dec. 27, 2022

(87) PCT Pub. No.: WO2022/009602
PCT Pub. Date: Jan. 13, 2022

(65) Prior Publication Data
US 2023/0244244 A1    Aug. 3, 2023

(30) Foreign Application Priority Data

Jul. 8, 2020   (JP) ................................. 2020-118065

(51) Int. Cl.
*G05D 1/00* (2024.01)
(52) U.S. Cl.
CPC .................................. *G05D 1/0274* (2013.01)
(58) Field of Classification Search
CPC .................................................... G05D 1/0274
See application file for complete search history.

(56) References Cited

U.S. PATENT DOCUMENTS

2016/0018524 A1*  1/2016  Zeng ...................... G01S 17/87
                                                              356/4.01

FOREIGN PATENT DOCUMENTS

| JP | 2013-200604 A | 10/2013 |
|----|---------------|---------|
| JP | 2014-173869 A | 9/2014 |
| JP | 2017-134514 A | 8/2017 |
| JP | 2019-168417 A | 10/2019 |
| JP | 2020-024618 A | 2/2020 |
| WO | 2018/229812 A1 | 12/2018 |

OTHER PUBLICATIONS

International Search Report and Written Opinion of PCT Application No. PCT/JP2021/022191, issued on Jul. 13, 2021, 12 pages of ISRWO.
Park, et al., "Probabilistic Surfel Fusion for Dense LiDAR Mapping", IEEE, International Conference on Computer Vision Workshops (ICCVW), Oct. 22-29, 2017, pp. 2418-2426.

* cited by examiner

*Primary Examiner* — Michael D Lang
(74) *Attorney, Agent, or Firm* — CHIP LAW GROUP

(57) ABSTRACT

An information processing apparatus includes a fusion section that fuses each of first clusters included in a first cluster group with each of second clusters included in a second cluster group to update the second cluster group, the first cluster group into which a piece of first point cloud data obtained by a sensor is clustered, and the second cluster group generated on the basis of a piece of second point cloud data obtained earlier than the piece of first point cloud data.

19 Claims, 12 Drawing Sheets

[FIG. 1]
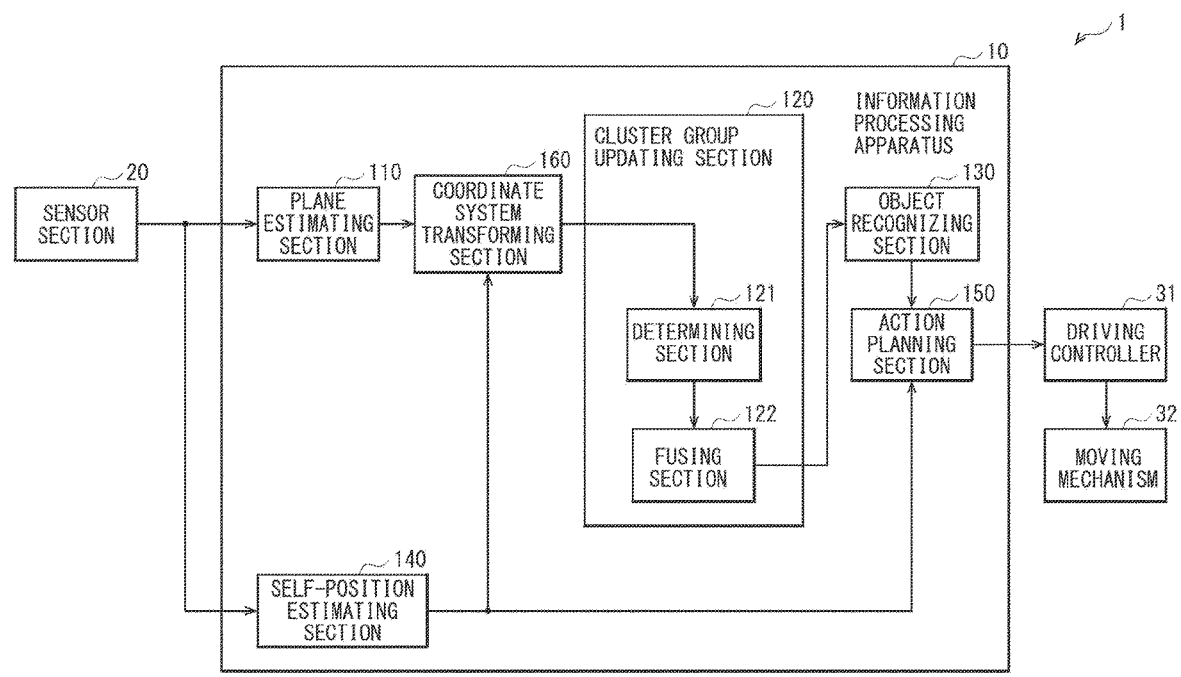

[FIG. 2]
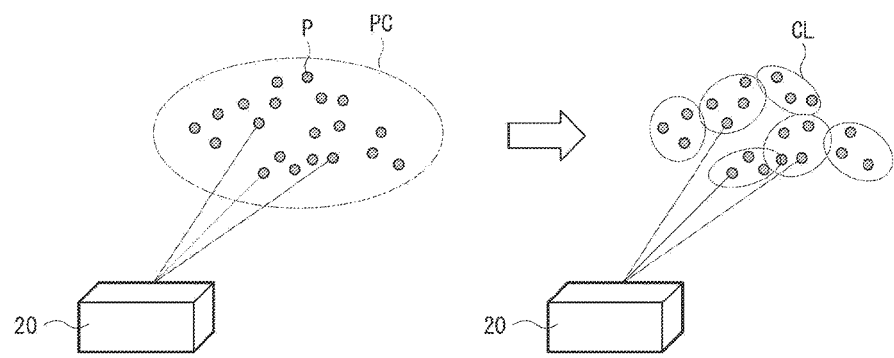

[FIG. 3]
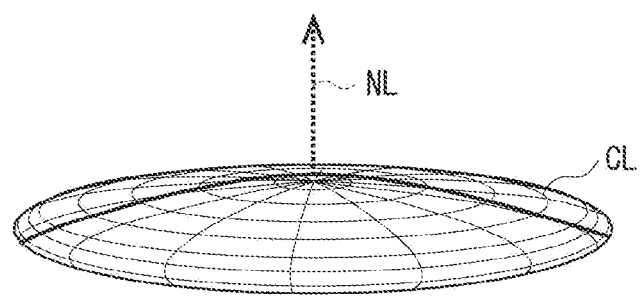
[FIG. 4]
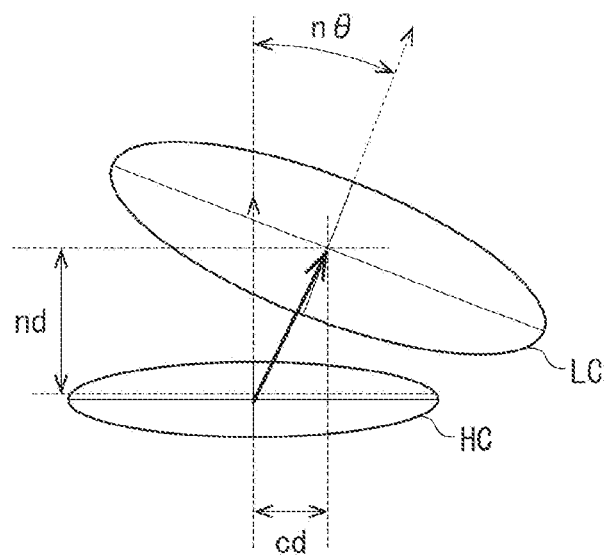

[FIG. 5]
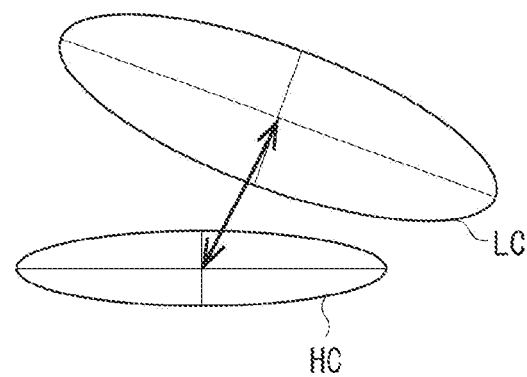
[FIG. 6]
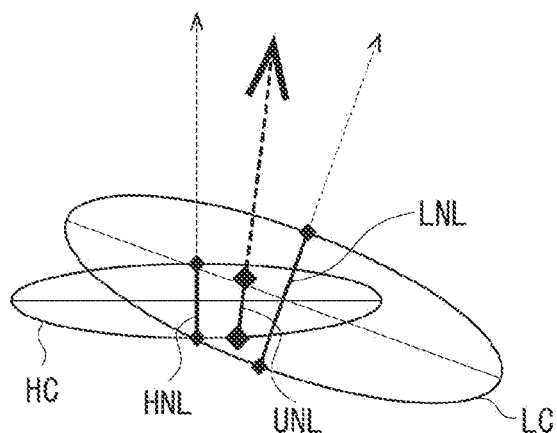
[FIG. 7]
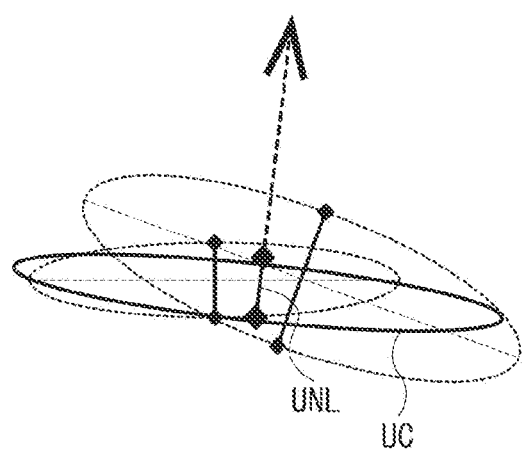

[FIG. 8]
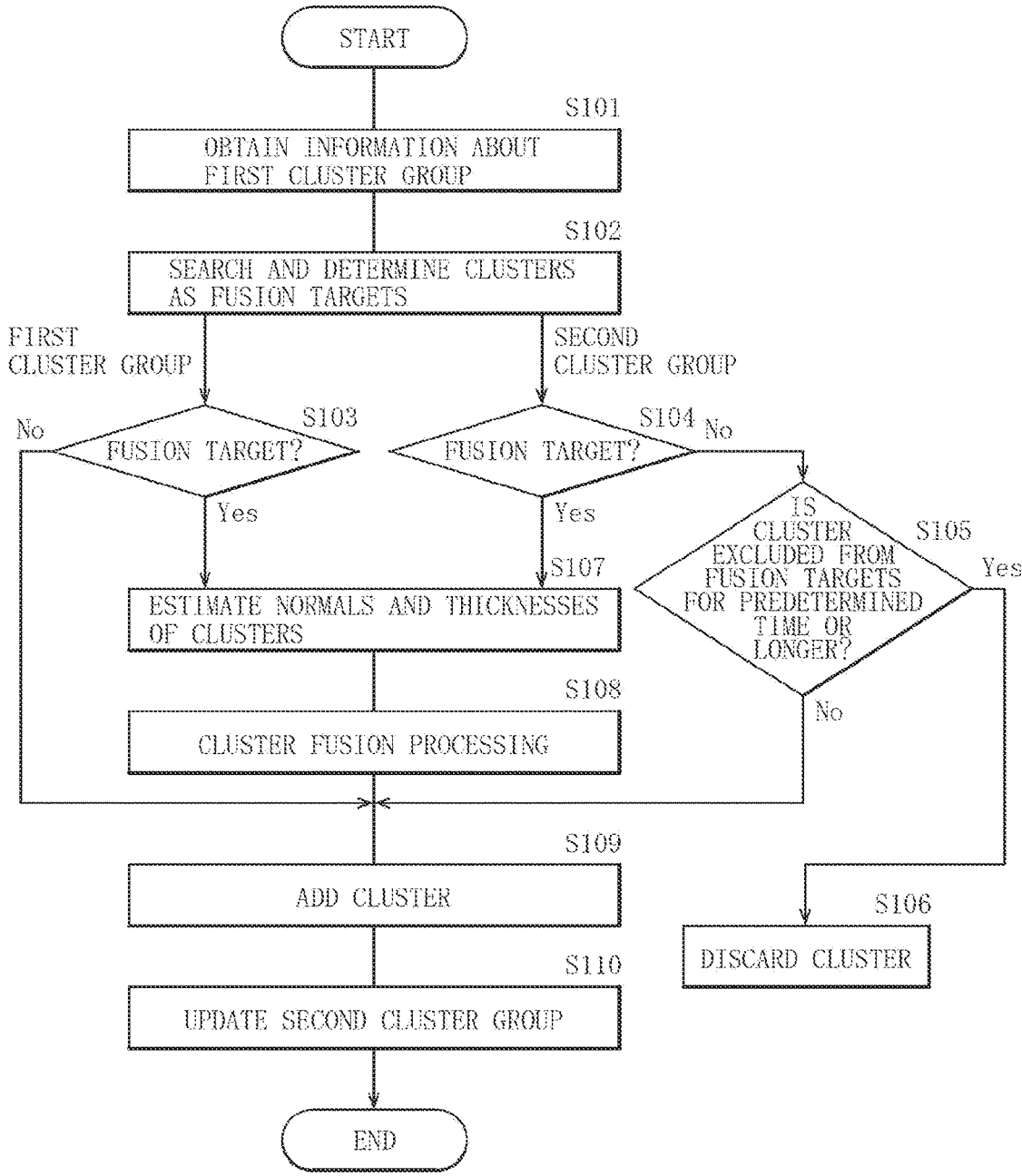

[FIG. 9]
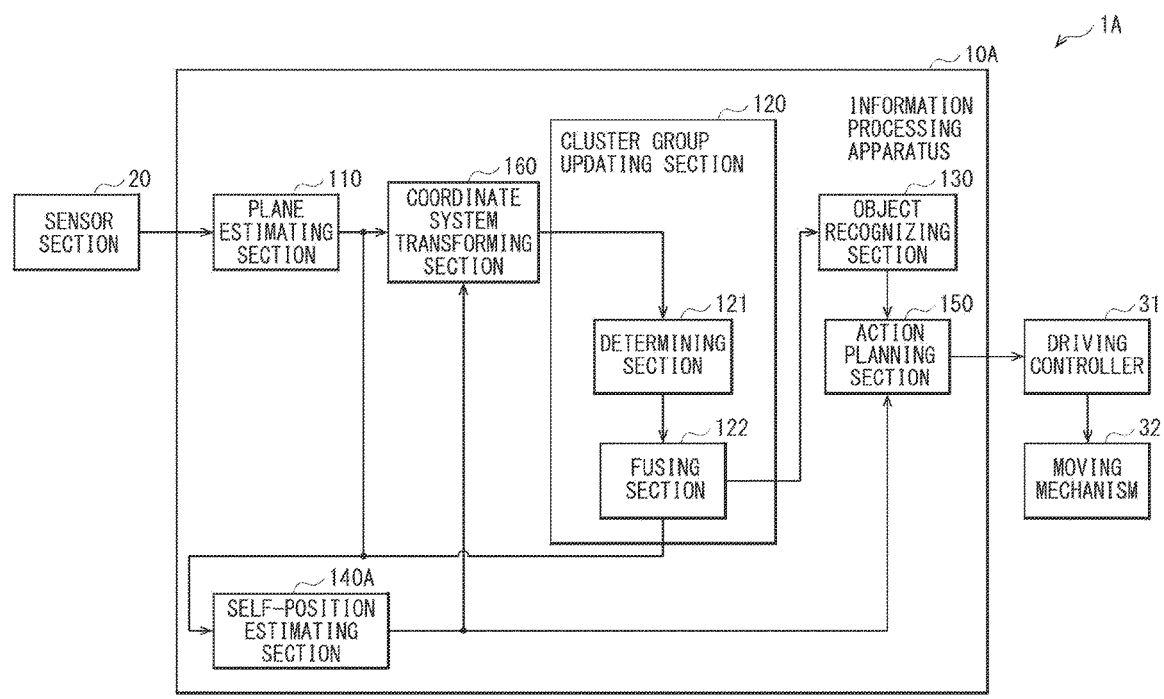

[FIG. 10]
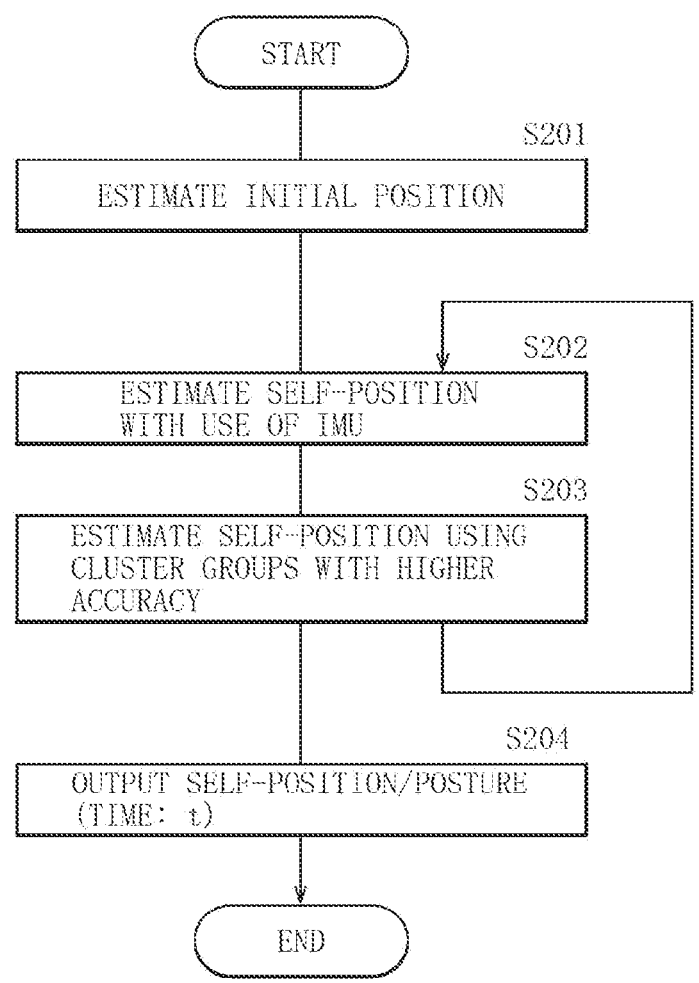

[FIG. 11]
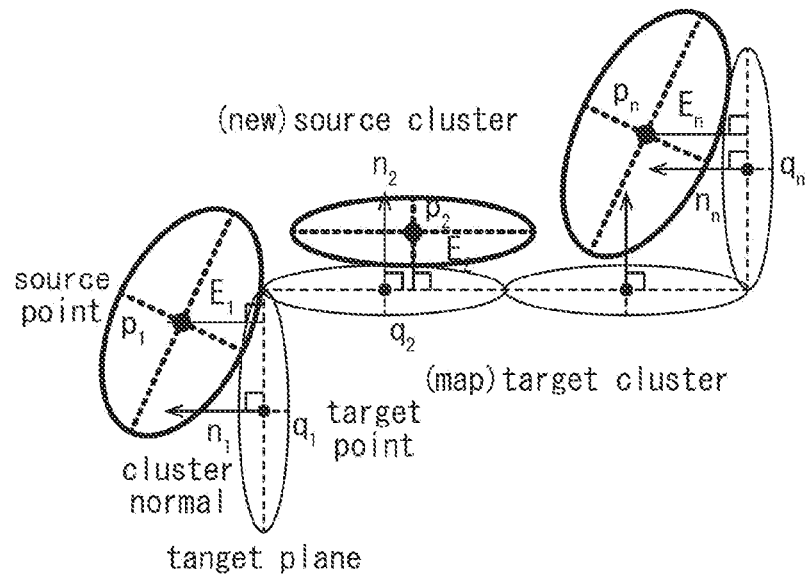
[FIG. 12]
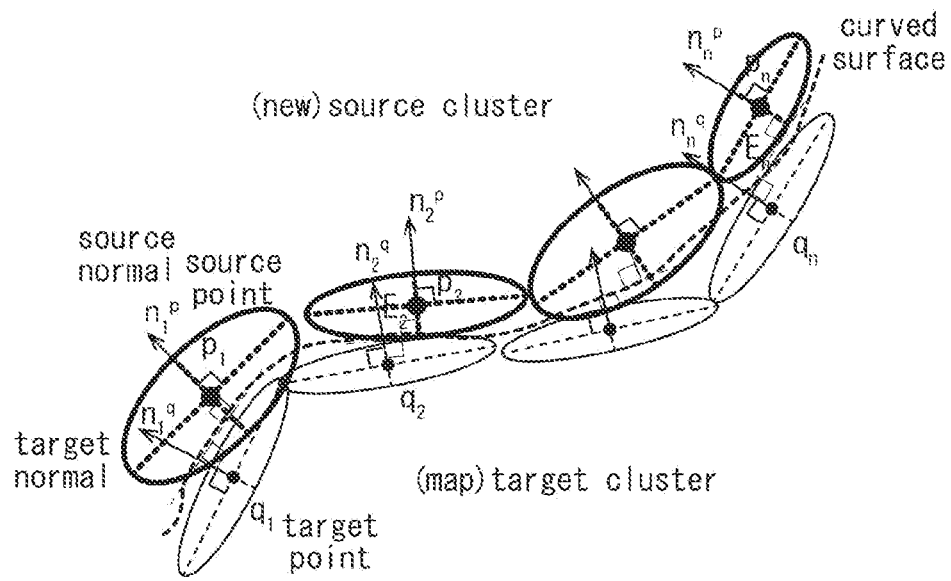

[FIG. 13]
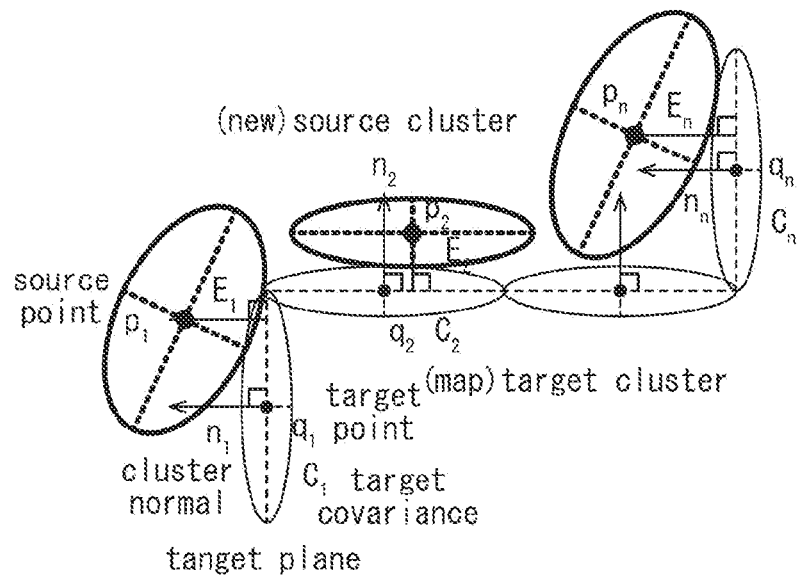
[FIG. 14]
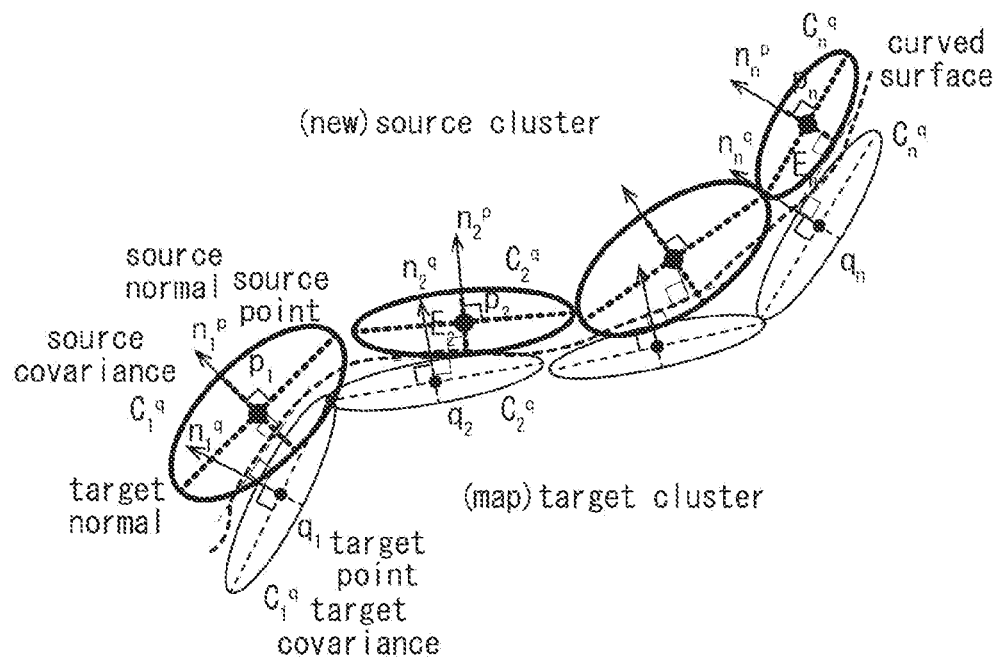

[FIG. 15]
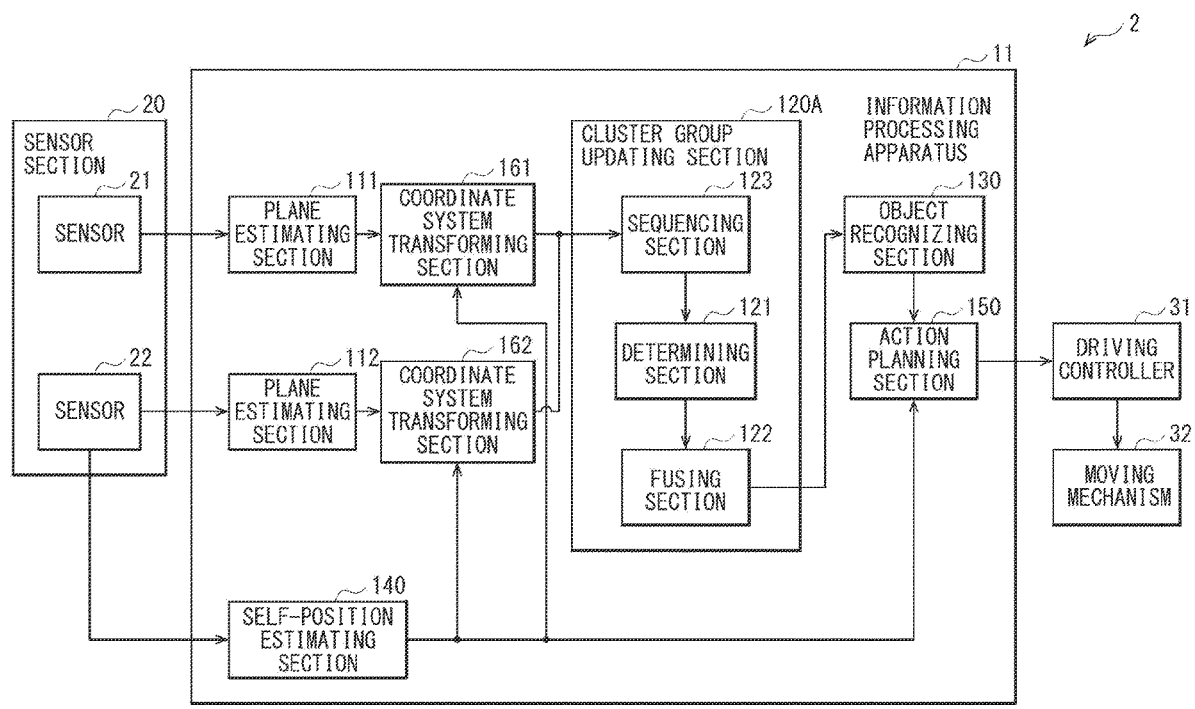

[FIG. 16]
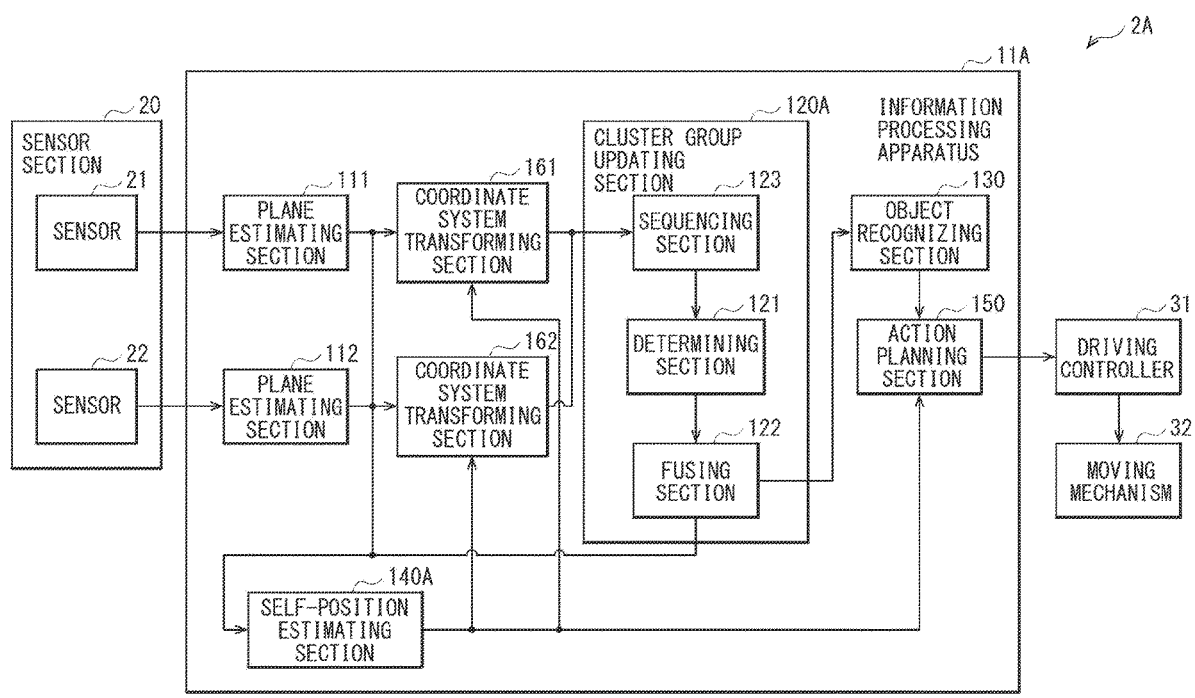

[FIG. 17]
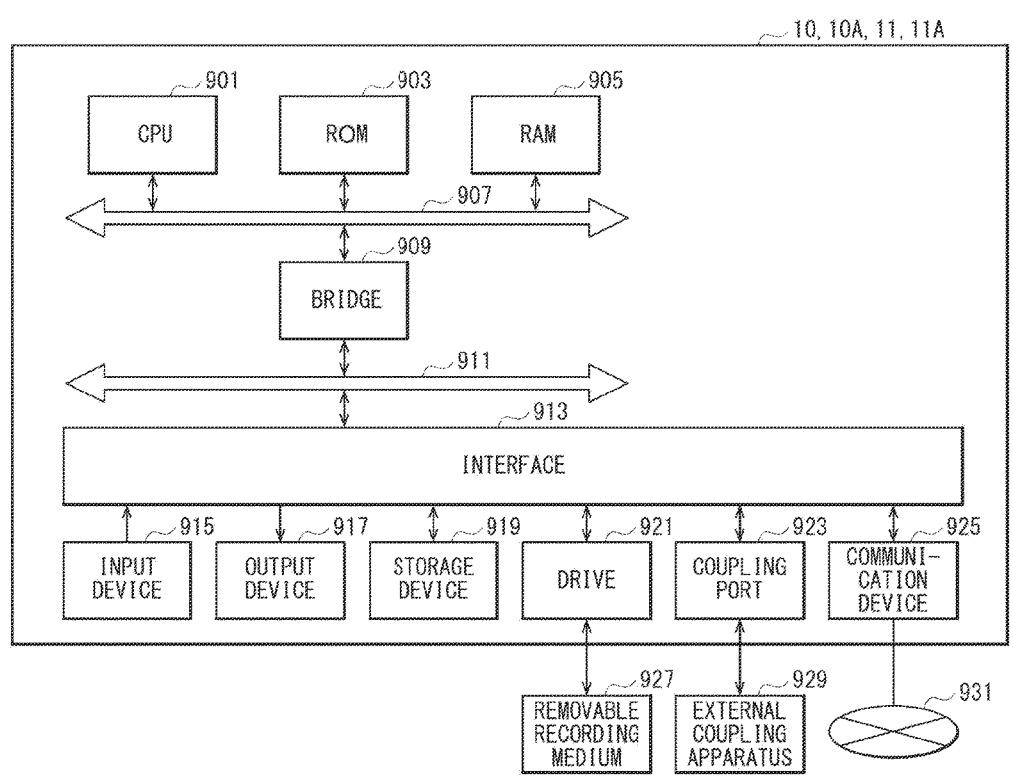

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2021/022191 filed on Jun. 10, 2021, which claims priority benefit of Japanese Patent Application No. JP 2020-118065 filed in the Japan Patent Office on Jul. 8, 2020. Each of the above-referenced applications is hereby incorporated herein by reference in its entirety.

TECHNICAL FIELD

The present disclosure relates to an information processing apparatus, an information processing method, and a program.

BACKGROUND ART

In recent years, a technology has been proposed to represent a surrounding environment as a set of microplanes on the basis of a sensing result by a sensor or the like (e.g., NPTL 1).

For example, a technology has been proposed to represent an object surface present in a surrounding environment as a piece of point cloud data by obtaining a distance and a direction to an object present in the surrounding environment by a distance measurement sensor or the like.

CITATION LIST

Non-Patent Literature

NPTL 1: Chanoh Park, et al., "Probabilistic Surfel Fusion for DenseLiDAR Mapping", IEEE International Conference on Computer Vision Workshops (ICCVW), 2017, 2418-2426

SUMMARY OF THE INVENTION

Such a piece of data representing a surrounding environment is desired to be updated promptly with a change in the surrounding environment.

It is therefore desirable to provide an information processing apparatus, an information processing method, and a program that make it possible to update a piece of data representing an environment with higher efficiency.

An information processing apparatus according to an embodiment of the present disclosure includes a fusion section that fuses each of first clusters included in a first cluster group with each of second clusters included in a second cluster group to update the second cluster group, the first cluster group into which a piece of first point cloud data obtained by a sensor is clustered, and the second cluster group generated on the basis of a piece of second point cloud data obtained earlier than the piece of first point cloud data.

An information processing method according to an embodiment of the present disclosure includes, with use of a calculation processor, fusing each of first clusters included in a first cluster group with each of second clusters included in a second cluster group to update the second cluster group, the first cluster group into which a piece of first point cloud data obtained by a sensor is clustered, and the second cluster group generated on the basis of a piece of second point cloud data obtained earlier than the piece of first point cloud data.

A program according to an embodiment of the present disclosure causes a computer to function as a fusion section that fuses each of first clusters included in a first cluster group with each of second clusters included in a second cluster group to update the second cluster group, the first cluster group into which a piece of first point cloud data obtained by a sensor is clustered, and the second cluster group generated on the basis of a piece of second point cloud data obtained earlier than the piece of first point cloud data.

In the information processing apparatus, the information processing method, and the program according to the embodiments of the present disclosure, it is possible to update the second cluster group by fusing each of clusters included in the first cluster group based on the piece of first point cloud data obtained by the sensor with each of clusters included in the second cluster group based on the piece of second point cloud data obtained earlier than the piece of first point cloud data. This makes it possible to represent a surrounding environment with use of cluster groups generated by performing information compression of a piece of point cloud data obtained by the sensor by clustering, and makes it possible to update the cluster group by sequentially fusing the cluster groups in time series.

BRIEF DESCRIPTION OF DRAWINGS

FIG. 1 is a block diagram illustrating an example of a functional configuration of a mobile body including an information processing apparatus according to a first embodiment of the present disclosure.

FIG. 2 is an explanatory diagram describing about a piece of point cloud data and clustering of the piece of point cloud data.

FIG. 3 is a schematic explanatory diagram illustrating the shape of a cluster corresponding to a microplane included in an object surface.

FIG. 4 is an explanatory diagram describing an example of a method of determining a cluster as a fusion target.

FIG. 5 is an explanatory diagram describing another example of the method of determining a cluster as a fusion target.

FIG. 6 is an explanatory diagram describing a method of estimating normal directions and thicknesses of fused clusters.

FIG. 7 is an explanatory diagram illustrating a normal direction, a thickness, and a cross-section of a fused second cluster.

FIG. 8 is a flowchart illustrating a flow of an operation of a cluster group updating section.

FIG. 9 is a block diagram illustrating a functional configuration of a mobile body including an information processing apparatus according to a modification example of the same embodiment.

FIG. 10 is a flowchart illustrating a flow of self-position estimation of the mobile body by a self-position estimating section.

FIG. 11 is an explanatory diagram describing a first example of self-position estimation of the mobile body based on a first cluster group and a second cluster group.

FIG. 12 is an explanatory diagram describing a second example of self-position estimation of the mobile body based on the first cluster group and the second cluster group.

FIG. 13 is an explanatory diagram describing a third example of self-position estimation of the mobile body based on the first cluster group and the second cluster group.

FIG. 14 is an explanatory diagram describing a fourth example of self-position estimation of the mobile body based on the first cluster group and the second cluster group.

FIG. 15 is a block diagram illustrating an example of a functional configuration of a mobile body including an information processing apparatus according to a second embodiment of the present disclosure.

FIG. 16 is a block diagram illustrating an example of a functional configuration of a mobile body including an information processing apparatus according to a modification example of the same embodiment.

FIG. 17 is a block diagram illustrating a hardware configuration example of an information processing apparatus according to an embodiment of the present disclosure.

MODES FOR CARRYING OUT THE INVENTION

In the following, embodiments of the present disclosure are described in detail with reference to the drawings. The embodiments described below are specific examples of the present disclosure, and the technology according to the present disclosure is not limited to the following embodiments. In addition, arrangements, dimensions, dimensional ratios, and the like of the respective constituent elements of the present disclosure are not limited to the embodiments illustrated in each of the drawings.

It is to be noted that description is given in the following order.

1. First Embodiment
1.1. Configuration Example
1.2. Operation Example
1.3. Modification Example
2. Second Embodiment
2.1. Configuration Example
2.2. Modification Example
3. Hardware Configuration Example

1. First Embodiment

1.1. Configuration Example

First, description is given of a mobile body including an information processing apparatus according to a first embodiment of the present disclosure with reference to FIG. 1. FIG. 1 is block diagram illustrating an example of a functional configuration of a mobile body 1 including an information processing apparatus 10 according to the present embodiment.

As illustrated in FIG. 1, the mobile body 1 includes a sensor section 20, the information processing apparatus 10 according to the present embodiment, a driving controller 31, and a moving mechanism 32. In addition, the information processing apparatus 10 according to the present embodiment includes a plane estimating section 110, a cluster group updating section 120, an object recognizing section 130, a self-position estimating section 140, an action planning section 150, and a coordinate system transforming section 160.

The mobile body 1 includes, for example, the moving mechanism 32, and is a robot, a drone, or the like that is autonomously movable. The information processing apparatus 10 included in the mobile body 1 is able to construct an environment map on the basis of, for example, a piece of data obtained by the sensor section 20 and plan a moving route of the mobile body 1 on the basis of the constructed environment map. The moving route planned by the information processing apparatus 10 is outputted to, for example, the driving controller 31 that controls the moving mechanism 32 of the mobile body 1, which allows the mobile body 1 to move along the planned moving route.

The information processing apparatus 10 may be provided inside the mobile body 1, or it is needless to say that the information processing apparatus 10 may be provided outside the mobile body 1. In a case where the information processing apparatus 10 is provided inside the mobile body 1, the information processing apparatus 10 is able to output a route plan to the driving controller 31 of the mobile body 1 through an internal wiring line. In addition, in a case where the information processing apparatus 10 is provided outside the mobile body 1, the information processing apparatus 10 is able to transmit a route plan to the driving controller 31 of the mobile body 1 through wireless communication or the like.

The sensor section 20 includes a sensor that senses a surrounding environment of the mobile body 1, and outputs a sensing result as a piece of point cloud data that is a set of points.

For example, the sensor section 20 may include a distance measurement sensor that measures a distance to an object, such as an ultrasonic sensor (Sound Navigation And Ranging: SONAR), a ToF (Time of Flight) sensor, a RADAR (Radio Detecting And Ranging), or a LiDAR (Light Detection And Ranging) sensor. In such a case, the sensor section 20 is able to generate the piece of point cloud data by transforming a measurement point obtained by the distance measurement sensor into a point in a three-dimensional coordinate system on the basis of information regarding a distance and a direction to the measurement point.

Alternatively, the sensor section 20 may include an imaging device that obtains an image of the surrounding environment of the mobile body 1, such as a stereo camera, a monocular camera, a color camera, an infrared-ray camera, a spectroscopic camera, or a polarization camera. In such a case, the sensor section 20 is able to generate a piece of point cloud data by estimating the depth of an image point included in a captured image on the basis of the captured image and transforming the image point into a point in a three-dimensional coordinate system on the basis of information regarding the estimated depth.

It is to be noted that the sensor section 20 may be provided to another device, an object, or the like outside the mobile body 1 as long as the sensor section 20 is able to sense the surrounding environment of the mobile body 1. For example, the sensor section 20 may be provided to a ceiling, a wall, a floor, or the like of a space where the mobile body 1 is present.

The plane estimating section 110 generates a cluster group by clustering a point cloud included in the piece of point cloud data obtained by the sensor section 20. The generated cluster group corresponds to a microplane group included in an object surface present around the mobile body 1.

Clustering of the piece of point cloud data and a cluster included in the cluster group are described in more detail with reference to FIGS. 2 and 3. FIG. 2 is an explanatory diagram describing about the piece of point cloud data and clustering of the piece of point cloud data. FIG. 3 is a schematic explanatory diagram illustrating the shape of a cluster corresponding to a microplane included in the object surface.

For example, the plane estimating section 110 is able to generate a cluster group including a plurality of clusters CL by clustering a point cloud PC that is a set of points P in a three-dimensional coordinate system, as illustrated in FIG.

2. Each of the clusters CL may be represented by, for example, an oblate ellipsoid based on central coordinates and a probability distribution shape of the cluster CL, as illustrated in FIG. 3. Specifically, the cluster CL may be represented by an oblate ellipsoid with an average value of coordinates of points included in the cluster CL as a center and covariance of the coordinates of the points included in the cluster CL as a thickness. The cluster CL having such an oblate ellipsoid is able to have a normal direction to a partial plane and a vector NL indicating a thickness in a normal direction of the oblate ellipsoid as representative parameters. In other words, the plane estimating section 110 is able to represent a microplane group included in the object surface present around the mobile body 1 by a cluster group including clusters represented by the oblate ellipsoid.

More specifically, the plane estimating section 110 may generate a cluster group corresponding to a microplane group included in the object surface by dividing a point cloud included in a piece of point cloud data into a plurality of partial point clouds and performing clustering of each of the divided partial point clouds according to the following procedure.

Specifically, the plane estimating section 110 first determines whether or not to perform division of a point cloud included in a piece of point cloud data on the basis of a predetermined division condition. In a case where the point cloud satisfies the predetermined division condition, the plane estimating section 110 divides the point cloud into substantially halves to generate two partial point clouds. Next, the plane estimating section 110 repeatedly divides the generated partial point cloud into substantially halves until the partial point cloud does not satisfy the division condition described above. Subsequently, the plane estimating section 110 determines whether or not to perform clustering of each of partial point clouds that are divided until not satisfying the division condition described above, on the basis of a predetermined clustering condition. Thereafter, the plane estimating section 110 performs clustering of each of partial point clouds that satisfy the predetermined clustering condition, which makes it possible to generate a cluster group corresponding to a microplane group included in the object surface.

Herein, the predetermined division condition described above may include a condition that the number of points included in the point cloud is equal to or larger than a predetermined number. In addition, the predetermined division condition may include a condition that in a case where a minimum rectangular parallelepiped region (also referred to as a bounding box) containing all points of the point cloud in a three-dimensional coordinate system is set, the length of the longest side of the rectangular parallelepiped region is equal to or longer than a predetermined length. In addition, the predetermined division condition may include a condition that density of points in the point cloud is equal to or higher than a predetermined value. The density of points in the point cloud may be, for example, a value obtained by dividing the number of points included in the point cloud by the size of the bounding box described above. In addition, the predetermined division condition may include a condition about the shape of the point cloud. Furthermore, the predetermined division condition may include a condition including a combination of two or more of the conditions described above.

In addition, the predetermined clustering condition may include a condition that the number of points included in the point cloud is equal to or larger than a predetermined number. In addition, the redetermined clustering condition may include a condition that the length of the longest side of the bounding box described above is equal to or longer than a predetermined length. In addition, the predetermined clustering condition may include a condition that the density of points in the point cloud described above is equal to or higher than a predetermined value. In addition, the predetermined clustering condition may include a condition about the shape of the point cloud. Furthermore, the predetermined clustering condition may include a condition including a combination of two or more of the conditions described above.

It is to be noted that an optimum condition may be appropriately set for each of the predetermined division condition and the predetermined clustering condition on the basis of characteristics of the point cloud, or the like.

Thus, the plane estimating section 110 performs clustering of each of point clouds that are divided until not satisfying the predetermined division condition, which makes it possible to reduce the size of each of the point clouds as clustering targets. This makes it possible for the plane estimating section 110 to further reduce processing time for clustering. In addition, the plane estimating section 110 is able to exclude a point cloud that does not satisfy the predetermined clustering condition and has a high possibility of being inaccurate from clustering targets, which makes it possible to further enhance accuracy of clustering.

The coordinate system transforming section 160 transforms position coordinates of each cluster of the cluster group generated by the plane estimating section 110 into relative coordinates to the environment map. Specifically, the coordinate system transforming section 160 transforms the position coordinates of each cluster into relative coordinates to the environment map on the basis of the self-position of the mobile body estimated by the self-position estimating section 140 to be described later. For example, the sensor section 20 mounted on the mobile body 1 changes its position with movement of the mobile body 1. Accordingly, the coordinate system transforming section 160 transforms the position coordinates of each cluster based on the piece of point cloud data obtained by the sensor section 20 into relative coordinates to the environment map on the basis of the self-position of the mobile body 1 on which the sensor section 20 is mounted. This makes it possible for the information processing apparatus 10 to handle a cluster group based on the piece of point cloud data obtained by the sensor section 20 on the same coordinates even in a case where the position of the sensor section 20 is changed.

The cluster group updating section 120 updates the position and the shape of each cluster of the cluster group corresponding to the microplane group included in the object surface with use of the piece of point cloud data obtained by the sensor section 20 as needed. Specifically, the cluster group updating section 120 may fuse a cluster group (referred to as a first cluster group) into which the piece of point cloud data (referred to as a piece of first point cloud data) obtained by the sensor section 20 is clustered with a cluster group (second cluster group) generated on the basis of a piece of point cloud data (referred to as a piece of second point cloud data) obtained earlier than the piece of first point cloud data to thereby update the second cluster group.

In other words, the cluster group updating section 120 is able to update the position and the shape of each cluster of the second cluster group by performing information compression of a piece of point cloud data obtained by the sensor section 20 by clustering, and sequentially fusing cluster groups (first cluster groups) generated by the information compression with a cluster group (second cluster group) generated in the past in time series.

This makes it possible for the cluster group updating section 120 to regard not a point included in a piece of point cloud data but a cluster included in a cluster group as a data handling unit, which makes it possible to reduce a data amount to be handled and a data computation amount. Consequently, it is possible for the information processing apparatus 10 to reflect the piece of point cloud data obtained by the sensor section 20 on the environment map with higher efficiency.

More specifically, the cluster group updating section 120 includes a determining section 121 and a fusing section 122. In the following, description is given of functions of the determining section 121 and the fusing section 122 with reference to FIGS. 4 to 7. FIG. 4 is an explanatory diagram describing an example of a method of determining a cluster as a fusion target. FIG. 5 is an explanatory diagram describing another example of the method of determining a cluster as a fusion target. FIG. 6 is an explanatory diagram describing a method of estimating normal directions and thicknesses of a first cluster and a second cluster as fusion targets. FIG. 7 is an explanatory diagram illustrating a normal direction, a thickness, and a shape of a fused cluster obtained by fusing the first cluster and the second cluster. In FIGS. 4 to 7, each cluster represented by an oblate ellipsoid as illustrated in FIG. 3 is represented by an elliptical shape that is a longitudinal section of the oblate ellipsoid (i.e., a cross-sectional view in the normal direction of the cluster).

The determining section 121 determines a combination of a cluster (referred to as a first cluster) included in the first cluster group and a cluster (referred to as a second cluster) included in the second cluster group as fusion targets.

As illustrated in FIG. 4, the determining section 121 may determine a combination of a first cluster LC included in the first cluster group and a second cluster HC included in the second cluster group as fusion targets on the basis of the position and shape of the first cluster LC and the position and shape of the second cluster HC. Specifically, the determining section 121 may determine the combination of the first cluster LC and the second cluster HC as fusion targets on the basis of an angle nθ between normal directions to respective partial planes of the first cluster LC and the second cluster HC, a normalized distance nd in the normal direction between the first cluster LC and the second cluster HC (a distance normalized by a cluster thickness), and a normalized distance cd in a partial plane direction between the first cluster LC and the second cluster HC (distance normalized by a cluster minor diameter length).

For example, the determining section 121 may determine the first cluster LC and the second cluster HC in which the angle nθ between the normal directions, the distance nd in the normal direction, and the distance cd in the partial plane direction are equal to or less than respective threshold values, as a combination of clusters as fusion targets. Alternatively, the determining section 121 may determine the first cluster LC and the second cluster HC in which the angle nθ between the normal directions, the distance nd in the normal direction, and the distance cd in the partial plane direction satisfy a predetermined relational expression, as a combination of clusters as fusion targets.

In addition, as illustrated in FIG. 5, the determining section 121 may determine the combination of the first cluster LC and the second cluster HC as fusion targets on the basis of a normalized distance between the first cluster LC included in the first cluster group and the second cluster HC included in the second cluster group. Specifically, the determining section 121 may determine the combination of the first cluster LC and the second cluster HC as fusion targets on the basis of a distance normalized by covariance. For example, it is possible to represent the distance normalized by the covariance (mahalonobis distance (mahalanobis_distance)) by the following mathematical formula group 1, where $\mu_j$ is a central point of the first cluster LC, $\Sigma_j$ is covariance of the first cluster LC, $\mu_i$ is a central point of the second cluster HC, and $\Sigma_i$ is covariance of the second cluster HC.

[Math. 1]

$$\Sigma_{ij} = (\sqrt{\Sigma_i} + \sqrt{\Sigma_j})^2$$

$$\text{mahalanobis\_distance} = \sqrt{(\mu_i - \mu_j)\Sigma_{ij}^{-1}(\mu_i - \mu_j)^T}$$

Mathematical Formula Group 1

It is to be noted that the determining section 121 may determine one second cluster HC as a fusion target cluster with respect to a plurality of second clusters LC, or may determine one first cluster as a fusion target cluster with respect to a plurality of second clusters HC.

In addition, the second cluster HC may not necessarily have the first cluster LC determined as a fusion target. As described later, the second cluster HC that is not determined as a fusion target with respect to the first cluster LC for a predetermined period or longer may be discarded upon updating the second cluster group by fusion with the first cluster group.

Conversely, the first cluster LC may not necessarily have the second cluster HC determined as a fusion target. In such a case, the first cluster LC is added to the second cluster group without being fused with the second cluster HC.

The fusing section 122 fuses the first cluster LC and the second cluster HC that are determined as fusion targets, on the basis of the shapes of the first cluster LC and the second cluster HC.

As illustrated in FIG. 6, the fusing section 122 first estimates a normal direction to the partial plane and a thickness in the normal direction of the first cluster LC (also referred to as a normal direction and a thickness LNL of the first cluster LC) and a normal direction to the partial plane and a thickness in the normal direction of the second cluster HC (also referred to as a normal direction and a thickness HNL of the second cluster HC) with high accuracy. Thereafter, the fusing section 122 fuses the first cluster LC and the second cluster HC with use of the normal direction and the thickness LNL of the first cluster LC and the normal direction and the thickness HNL of the second cluster HC that are estimated with high accuracy.

Specifically, the fusing section 122 is able to estimate the normal direction and the thickness LNL of the first cluster LC and the normal direction and the thickness HNL of the second cluster HC with high accuracy with use of a Kalman filter.

For example, the fusing section 122 may define specifications of the Kalman filter with use of the following cluster components and estimate the normal direction and the thickness LNL of the first cluster LC and the normal direction and the thickness of HNL of the second cluster on the basis of a Kalman filter prediction equation represented by a mathematical formula group 2 and a Kalman filter update equation represented by a mathematical formula group 3.

$x_t$: Normal vector of second cluster HC
$(\sigma_x)^2_t$: Thickness in normal direction of second cluster HC
$z_t$: Normal vector of first cluster LC $\sigma_z^2$: Thickness in normal direction of first cluster LC
$\sigma_w^2$: System noise (hyper parameter)

[Math. 2]

Mathematical Formula Group 2
(Kalman Filter Prediction Equation)

$$\hat{x}_t = x_{t-1}$$
$$(\widehat{\sigma_x})^2_{t^-} = (\sigma_x)^2_{t-1} + \sigma_w^2$$

[Math. 3]

Mathematical Formula Group 3
(Kalman Filter Update Equation)

$$G = \frac{(\widehat{\sigma_x})^2_{t^-}}{(\widehat{\sigma_x})^2_{t^-} + \sigma_z^2}$$
$$x_t = \hat{x}_t + G(z_t - \hat{x}_t)$$
$$(\sigma_x)^2_t = (1-G)(\widehat{\sigma_x})^2_{t^-}$$

Thereafter, as illustrated in FIG. 7, the fusing section 122 derives a normal direction and a thickness UNL of a fused cluster UC on the basis of the normal direction and the thickness LNL of the first cluster LC and the normal direction and the thickness HNL of the second cluster HC that are estimated. Thus, it is possible for the fusing section 122 to update the position and shape of the second cluster HC included in the second cluster group by the fused cluster UC generated by fusing the first cluster LC included in the first cluster group and the second cluster HC included in the second cluster group.

Specifically, the fusing section 122 may fuse the first cluster LC and the second cluster HC by simple fusion processing by a cluster shape. For example, it is possible to represent a central point $\mu_{merged}$ and covariance $\Sigma_{merged}$ of the fused cluster UC by the following mathematical formula group 4, where is the central point of the first cluster LC, $\Sigma_j$ is covariance of the first cluster LC, $\mu_i$ is the central point of the second cluster HC, and $\Sigma_i$ is covariance of the second cluster HC.

[Math. 4]

$$\mu_{merged}=(\mu_i+\mu_j)/2$$

$$\Sigma_{merged}=(\Sigma_i+\Sigma_j)/2 \quad \text{Mathematical Formula Group 4}$$

In addition, the fusing section 122 may fuse the first cluster LC and the second cluster HC by fusion processing including fusion cluster pairs by the cluster shape. For example, it is possible to represent the central point $\mu_{merged}$ and covariance $\Sigma_{merged}$ of the fused cluster UC by the following mathematical formula group 5, where is the central point of the first cluster LC, $\Sigma_j$ is covariance of the first cluster LC, $\mu_i$ is the central point of the second cluster HC, and $\Sigma_i$ is covariance of the second cluster HC.

[Math. 5]

$$\mu_{merged}=\|\Sigma_i\|_2/(\|\Sigma_i\|_2+\|\Sigma_j\|_2)\times\mu_i+\|\Sigma_j\|_2/(\|\Sigma_i\|_2+\|\Sigma_j\|_2)\times\mu_j$$

$$\Sigma_{merged}=\Sigma_{ave}+\text{coef}\times\text{mahalanobis\_distance}\times$$
$$(\mu_{ij}^T \cdot \Sigma_{ave} \cdot \mu_{ij})\times MAT_{\mu_{ij}} \quad \text{Mathematical Formula Group 5}$$

In the mathematical formula group 5,
$\|\Sigma\|_2$: L2 norm of covariance $\Sigma$
coef: Adjustment coefficient
mahalanobis_distance: Distance normalized by covariance $$\Sigma_{ave} = \left(\Sigma_i + \Sigma_j\right)/2$$

-continued $$\mu_{1j}^* = (\mu_i - \mu_j) = \begin{pmatrix} a \\ b \\ c \end{pmatrix}$$

$$MAT_{\overrightarrow{\mu_{i,j}}} = \begin{pmatrix} a^2 & ab & ac \\ ab & b^2 & bc \\ ac & bc & c^2 \end{pmatrix}$$

In addition, the fusing section 122 may fuse the first cluster LC and the second cluster HC by fusing processing using a cluster weight. Specifically, the fusing section 122 may fuse the first cluster LC and the second cluster HC by using, as the cluster weight, the number of point clouds in pieces of point cloud data used for generation of the first cluster group and the second cluster group. For example, it is possible to represent the central point $\mu_{merged}$ and covariance $\Sigma_{merged}$ of the fused cluster UC by the following mathematical formula group 6, where $\mu_j$ is the central point of the first cluster LC, $\Sigma_j$ is covariance of the first cluster LC, $\mu_i$ is the central point of the second cluster HC, and $\Sigma_i$ is covariance of the second cluster HC. It is to be noted that $w_i$ is the number of point clouds in a piece of point cloud data used for generation of the first cluster group including the first cluster LC, and $w_j$ is the number of point clouds in a piece of point cloud data used for generation of the second cluster group including the second cluster HC.

[Math. 6]

$$\mu_{merged}=w_i/(w_i+w_j)\times\mu_i+w_j/(w_i+w_j)\times\mu_j$$

$$\Sigma_{merged}=w_i/(w_i+w_j)\times\Sigma_i+w_j/(w_i+w_j)\times\Sigma_j \quad \text{Mathematical Formula Group 6}$$

Furthermore, the fusing section 122 may fuse the first cluster LC and the second cluster HC by fusion processing using cluster reliability. Specifically, the fusing section 122 may fuse the first cluster LC and the second cluster HC by using, as the cluster weight, reliability of the sensor section 20 upon obtaining pieces of point cloud data used for generation of the first cluster group and the second cluster group. For example, it is possible to represent the central point $\mu_{merged}$ and covariance $\Sigma_{merged}$ of the fused cluster UC by the following mathematical formula group 7, where $\mu_j$ is the central point of the first cluster LC, $\Sigma_j$ is covariance of the first cluster LC, $\mu_i$ is the central point of the second cluster HC, and $\Sigma_i$ is covariance of the second cluster HC. It is to be noted that $c_i$ is reliability upon obtaining a piece of point cloud data used for generation of the first cluster group including the first cluster LC and $c_j$ is reliability upon obtaining a piece of point cloud data used for generation of the second cluster group including the second cluster HC.

[Math. 7]

$$\mu_{merged}=c_i/(c_i+c_j)\times\mu_i+c_j/(c_i+c_j)\times\mu_j$$

$$\Sigma_{merged}=c_i/(c_i+c_j)\times\Sigma_i+c_j/(c_i+c_j)\times\Sigma_j \quad \text{Mathematical Formula Group 7}$$

Herein, the fusing section 122 may continue to hold, in the second cluster group, the second cluster HC that is not a fusion target with respect to the first cluster LC among the second clusters HC included in the second cluster group for a predetermined period. Thereafter, upon updating of the second cluster group, the fusing section 122 may discard the second cluster HC that is not a fusion target with respect to the first cluster LC for the predetermined period or longer. In addition, the fusing section 122 may add, to the second cluster group, the first cluster LC as it is that is not a fusion target with respect to the second cluster HC among the first clusters LC included in the first cluster group.

The object recognizing section 130 groups one or more clusters included in a cluster group updated by the cluster group updating section 120 to recognize an object corresponding to the one or more clusters grouped. For example, the object recognizing section 130 may recognize an object present around the mobile body 1 on the basis of shapes, positions of clusters included in the cluster group, an intervals between the clusters, or the like. Alternatively, the object recognizing section 130 may recognize the object present around the mobile body 1 by associating the shapes and positions of the clusters included in the cluster group with a captured image obtained by an imaging device included in the sensor section 20.

Furthermore, the object recognizing section 130 constructs an environment map representing each of the clusters with use of central coordinates and a probability distribution shape on the basis of the recognized object. It is to be noted that the object recognizing section 130 may construct a two-dimensional plane environment map or may construct a three-dimensional space environment map. The object recognizing section 130 constructs an environment map with use of clusters represented by an oblate ellipsoid, which makes it possible to reduce the data amount of the environment map, as compared with a case where an environment map is constructed with use of a so-called grid map. Thus, it is possible for the object recognizing section 130 to construct the environment map for a short time even with less computation resources.

The self-position estimating section 140 estimates the position of the mobile body 1 in the environment map on the basis of information regarding the surrounding environment of the mobile body 1 obtained by the sensor section 20. Furthermore, the self-position estimating section 140 generates a piece of self-position data indicating the estimated position of the mobile body 1, and outputs the piece of self-position data to the coordinate system transforming section 160 and the action planning section 150.

Alternatively, the self-position estimating section 140 may estimate the position of the mobile body 1 on the basis of a sensing result by a sensor that measures the state of the mobile body 1. For example, the self-position estimating section 140 may estimate the position of the mobile body 1 by calculating the moving direction and the moving distance of the mobile body 1 on the basis of a sensing result by an encoder provided at each joint of a leg section included in the moving mechanism 32 of the mobile body 1. For example, the self-position estimating section 140 may estimate the position of the mobile body 1 by calculating the moving direction and the moving distance of the mobile body 1 on the basis of a sensing result by an encoder provided on each wheel included in the moving mechanism 32 of the mobile body 1. For example, the self-position estimating section 140 may estimate the position of the mobile body 1 by calculating the moving direction and the moving distance of the mobile body 1 on the basis of a sensing result by an IMU (Inertial Measurement Unit) that includes a three-axis gyroscope sensor and a three-way accelerometer included in the mobile body 1.

Furthermore, the self-position estimating section 140 may estimate the position of the mobile body 1 on the basis of information obtained by another sensor such as a GNSS (Global Navigation Satellite System) sensor.

The action planning section 150 creates an action plan of the mobile body 1 by grasping the state of surroundings of the mobile body 1 on the basis of information obtained from the sensor section 20 or the like. Specifically, the action planning section 150 may plan a moving route to a destination of the mobile body 1 on the basis of the environment map around the mobile body 1 and the piece of self-position data of the mobile body 1.

The driving controller 31 controls driving of the moving mechanism 32 to move the mobile body 1 along the moving route planned by the action planning section 150. For example, the driving controller 31 may move the mobile body 1 along the moving route by controlling the moving mechanism 32 to reduce a difference between the position of mobile body 1 on the moving route planned by the action planning section 150 at a predetermined time and the actual position of the mobile body 1.

The moving mechanism 32 is, for example, a mechanism that makes the mobile body 1 movable on the ground, on the water, in the water, or in the air. Examples of the moving mechanism 32 may include a moving mechanism such as a two-wheeled or four-wheeled wheel allowing for traveling on the ground, a moving mechanism such as a two-legged or four-legged leg section allowing for walking on the ground, a moving mechanism such as a propeller or a rotary wing allowing for flying in the air, a moving mechanism such as a screw allowing for moving on the water or in the water, and the like.

According to the above configuration, the information processing apparatus 10 according to the present embodiment is able to perform information compression of a piece of point cloud data that senses a surrounding environment by clustering and represent the surrounding environment with a cluster group having been subjected to the information compression. This makes it possible to reduce the data amount to be handled and an computational load.

In addition, the information processing apparatus 10 according to the present embodiment estimates the normal directions and thicknesses of clusters by a Kalman filter, which makes it possible to sequentially fuse the clusters with use of the estimated normal directions and thicknesses with higher accuracy. This makes it possible for the information processing apparatus 10 to create an environment map representing the surrounding environment of the mobile body 1 with higher accuracy.

Thus, it is possible for the information processing apparatus 10 according to the present embodiment to reduce processing time for surrounding environment recognition processing, which allows for enhancement of response speed of the mobile body 1. In addition, the information processing apparatus 10 allows for enhancement of recognition accuracy with respect to the surrounding environment, which makes it possible to plan an efficient moving route with a less margin for an object present in the surrounding environment.

1.2. Operation Example

Next, description is given of a flow of an operation of the information processing apparatus 10 according to the present embodiment with reference to FIG. 8. In the following, the flow of the operation is described focused on the cluster group updating section 120 among components included in the information processing apparatus 10. FIG. 8 is a flowchart illustrating an example of the operation of the cluster group updating section 120.

As illustrated in FIG. 8, the determining section 121 first obtains a piece of data of the first cluster group into which a piece of point cloud data obtained by the sensor section 20 is clustered (S101). Next, the determining section 121 searches and determines, as fusion targets, each of the first clusters included in the first cluster group and the second cluster included in the second cluster group (S102).

Herein, the second cluster group is a cluster group generated earlier than the first cluster group. In other words, the second cluster group is a cluster group generated by clustering the piece of second point cloud data obtained earlier than the piece of first point cloud data used for generation of the first cluster group, or a cluster group obtained by further updating the cluster group.

Specifically, the determining section 121 determines whether or not the first clusters included in the first cluster group each have the second cluster as a fusion target (S103). After estimation of the normal directions and thicknesses to be described later (S107), the first cluster having the second cluster as the fusion target (S103/Yes) is fused with the second cluster as the fusion target in a step of cluster fusion processing (S108).

In contrast, the first cluster not having the second cluster as the fusion target (S103/No) is added to the second cluster group as it is in a step of cluster addition (S109).

In addition, the determining section 121 determines whether or not the second clusters included in the second cluster group each have the first cluster as a fusion target (S104). After estimation of the normal directions and thicknesses (S107), the second cluster having the first cluster as the fusion target (S104/Yes) is fused with the first cluster as the fusion target in the subsequent step of cluster fusion processing (S108).

In contrast, whether or not the second cluster not having the first cluster as the fusion target (S104/No) is excluded from fusion targets for a predetermined time or longer is further determined (S105). In a case where the second cluster is excluded from the fusion targets for the predetermined period or longer (S105/Yes), the second cluster is discarded (S106). In contrast, in a case where the second cluster is excluded from the fusion targets for less than the predetermined period, the second cluster is not discarded and is added as it is to the second cluster group in the step of cluster addition (S109).

Thereafter, the fusing section 122 estimates each of the normal directions and the thicknesses of the first cluster and the second cluster as the fusion targets with use of a Kalman filter (S107). Next, the first cluster and the second cluster are fused on the basis of the estimated normal directions and the estimated thicknesses (S108). Furthermore, the fusing section 122 adds the first cluster and the second cluster having bypassed the fusion processing to a fused second cluster (S109) to update the second cluster group (S110).

Thereafter, the cluster group updating section 120 newly obtains a first cluster group into which a piece of point cloud data newly obtained by the sensor section 20 is clustered (S101) and repeatedly executes updating of the second cluster group.

According to the above operation, the information processing apparatus 10 according to the present embodiment sequentially fuses cluster groups representing the surrounding environment in time series, which allows for enhancement of recognition accuracy of the surrounding environment.

1.3. Modification Example

Next, description is given of a mobile body including an information processing apparatus according to a modification example of the present embodiment with reference to FIGS. 9 to 14. FIG. 9 is a block diagram illustrating a functional configuration of a mobile body 1A including an information processing apparatus 10A according to the present modification example.

As illustrated in FIG. 9, in the information processing apparatus 10A according to the present modification example, a self-position estimating section 140A is able to estimate the self-position of the mobile body 1A with higher accuracy by further using the first cluster group and the second cluster group. Specifically, the self-position estimating section 140A may estimate the self-position of the mobile body 1A on the basis of a flowchart illustrated in FIG. 10. FIG. 10 is a flowchart illustrating a flow of self-position estimation of the mobile body 1A by the self-position estimating section 140A.

As illustrated in FIG. 10, the self-position estimating section 140A first sets the reference of map coordinates of the environment map (S201). Specifically, the self-position estimating section 140 may estimate an initial position of the mobile body 1A by absolute coordinates on the Earth obtained by a GNSS sensor and set the absolute coordinates of the mobile body 1A as the reference of map coordinates (Earth-centered coordinate system). Alternatively, the self-position estimating section 140A may set the initial position of the mobile body 1A as a zero point as the reference of the map coordinates (relative coordinate system).

Subsequently, the self-position estimating section 140A estimates the self-position and posture of the mobile body 1A on the basis of, for example, a sensing result by an IMU or the like (S202). Specifically, the self-position estimating section 140A may estimate the self-position and posture of the mobile body 1A with use of a sensing result by the IMU for a period until obtaining a piece of point cloud data by the sensor section 20 with reference to the position and posture of the initial position of the mobile body 1A. Alternatively, the self-position estimating section 140A may estimate the self-position and posture of the mobile body 1A with use of a sensing result by the IMU for displacement from a time t−1 to a time t with reference to the position and posture of the mobile body 1A at a previous time (t−1).

Furthermore, the self-position estimating section 140A may estimate the self-position and posture of the mobile body 1A with use of the moving amount of the mobile body 1A estimated by an encoder or the like included in the moving mechanism 32 of the mobile body 1. In addition, the self-position estimating section 140A may correct a result of self-position estimation with use of a piece of geomagnetic data or GNSS data.

Next, the self-position estimating section 140A performs self-position estimation of the mobile body 1A using cluster groups with use of the position and posture (time t) of the mobile body 1A estimated in S202 as initial values (S203). Specifically, the self-position estimating section 140A is able to estimate the self-position and posture of the mobile body 1A with higher accuracy by performing matching of cluster groups including the first cluster group based on a piece of point cloud data obtained at the time t as a source and the second cluster group having been subjected to fusion processing at the previous time as a target. Thereafter, the self-position estimating section 140A outputs the self-position and posture of the mobile body 1A at the time t that are estimated with high accuracy (S204).

It is to be noted that the self-position estimating section 140A may skip the step (S202) of self-position estimation with use of the IMU and execute only the step (S203) of self-position estimation using the cluster groups. In such a case, the self-position estimating section 140A may use the position and posture of the mobile body 1A at the previous time (time t−1) as initial values of the self-position estimation using the cluster groups.

First to fourth examples of a method of matching cluster groups to be performed by the self-position estimating section 140A is described in detail with reference to FIGS. 11 to 14.

FIG. 11 is an explanatory diagram describing the first example of self-position estimation of the mobile body 1A based on the first cluster group and the second cluster group. The self-position estimating section 140A is able to estimate the self-position and posture of the mobile body 1A by performing matching of the cluster groups with use of Point To Plane ICP on the cluster groups. The first example of the self-position estimation is a method suitable in a case where an object surface present in an external field environment mainly includes a flat surface.

As illustrated in FIG. 11, the self-position estimating section 140A first defines specifications of the cluster groups as follows.

$p_1, p_2, \ldots p_n$: Central point of source cluster group
$q_1, q_2, \ldots q_n$: Central point of target cluster group
$n_1, n_2, \ldots n_n$: Normal of target cluster group Herein, the self-position estimating section 140A estimates R and t that cause a loss function E represented by the following mathematical formula 8 to be minimized. R that is a rotation matrix corresponds to a posture to be estimated of the mobile body 1A, and t that is a translation matrix corresponds to a position to be estimated of the mobile body 1A; therefore, the self-position estimating section 140A is able to estimate the self-position and posture of the mobile body 1A by estimating R and t.

[Math. 8]

$$E = \mathrm{argmin}\ \Sigma_i [((Rp_i + t) - q_i) \cdot n_i]^2 \quad \text{Mathematical Formula 8}$$

FIG. 12 is an explanatory diagram describing the second example of self-position estimation of the mobile body 1A based on the first cluster group and the second cluster group. The self-position estimating section 140A is able to estimate the self-position and posture of the mobile body 1A by matching the cluster groups with use of Symmetric ICP on the cluster groups. The second example of self-position estimation is a method suitable in a case where the object surface present in the external field environment mainly includes a curved surface.

As illustrated in FIG. 12, the self-position estimating section 140A first defines specifications of the cluster groups as follows.

$p_1, p_2, \ldots p_n$: Central point of source cluster group
$n_1^p, n_2^p, \ldots n_n^p$: Normal of source cluster group
$q_1, q_2, \ldots q_n$: Central point of target cluster group
$n_1^q, n_2^q, \ldots n_n^q$: Normal of target cluster group Herein, the self-position estimating section 140A estimates R and t that cause a loss function E represented by the following mathematical formula 9 to be minimized. R that is a rotation matrix corresponds to a posture to be estimated of the mobile body 1A, and t that is a translation matrix corresponds to a position to be estimated of the mobile body 1A; therefore, the self-position estimating section 140A is able to estimate the self-position and posture of the mobile body 1A by estimating R and t.

[Math. 9]

$$E = \mathrm{argmin}\ \Sigma_i [(Rp_i + t - q_i) \cdot (n_i^p + n_i^q)]^2 \quad \text{Mathematical Formula Group 9}$$

FIG. 13 is an explanatory diagram describing the third example of self-position estimation of the mobile body 1A based on the first cluster group and the second cluster group. The self-position estimating section 140A is able to estimate the self-position and posture of the mobile body 1A by matching the cluster groups with use of Point To Plane ICP with covariance on the cluster group. The third example of self-position estimation is a method suitable in a case where the object surface present in the external field environment mainly includes a flat surface and covariance is large.

As illustrated in FIG. 13, the self-position estimating section 140A first defines specifications of the cluster groups as follows.

$p_1, p_2, \ldots p_n$: Central point of source cluster group
$q_1, q_2, \ldots q_n$: Central point of target cluster group
$n_1, n_2, \ldots n_n$: Normal of target cluster group
$C_1, C_2, \ldots C_n$: Covariance of target cluster group Herein, the self-position estimating section 140A estimates R and t that cause a loss function E represented by the following mathematical formula 10 to be minimized. R that is a rotation matrix corresponds to a posture to be estimated of the mobile body 1A, and t that is a translation matrix corresponds to a position to be estimated of the mobile body 1A; therefore, the self-position estimating section 140A is able to estimate the self-position and posture of the mobile body 1A by estimating R and t.

[Math. 10]

$$E = \mathrm{argmin}\ \Sigma_i [((Rp_i + t) - q_i) \cdot n_i]^2 / C_i \quad \text{Mathematical Formula Group 10}$$

FIG. 14 is an explanatory diagram describing the fourth example of self-position estimation of the mobile body 1A based on the first cluster group and the second cluster group. The self-position estimating section 140A is able to estimate the self-position and posture of the mobile body 1A by matching the cluster groups with use of Symmetric ICP with covariance on the cluster group. The fourth example of self-position estimation is a method suitable in a case where the object surface present in the external field environment mainly includes a curved surface and covariance is large.

As illustrated in FIG. 14, the self-position estimating section 140A first defines specifications of the cluster groups as follows.

$p_1, p_2, \ldots p_n$: Central point of source cluster group
$n_1^p, n_2^p, \ldots n_n^p$: Normal of source cluster group
$C_1^p, C_2^p, \ldots C_n^p$: Covariance of source cluster group
$q_1, q_2, \ldots q_n$: Central point of target cluster group
$n_1^q, n_2^q, \ldots n_n^q$: Normal of target cluster group
$C_1^q, C_2^q, \ldots C_n^q$: Covariance of target cluster group Herein, the self-position estimating section 140A estimates R and t that cause a loss function E represented by the following mathematical formula 11 to be minimized. R that is a rotation matrix corresponds to a posture to be estimated of the mobile body 1A, and t that is a translation matrix corresponds to a position to be estimated of the mobile body 1A; therefore, the self-position estimating section 140A is able to estimate the self-position and posture of the mobile body 1A by estimating R and t.

[Math. 11]

$$E = \mathrm{argmin}\ \Sigma_i [((R p_i + t) - q_i) \cdot (n_i^p + n_i^q)]^2 / (R C_i^p R^T + C_i^q) \quad \text{Mathematical Formula Group 11}$$

The methods of matching the cluster groups described above may be performed in combination. In addition, the self-position estimating section 140A may collectively perform self-position estimation executed in the steps of S202 and S203 with use of a technique of Bundle Adjustment to estimate the self-position and posture of the mobile body 1A.

2. Second Embodiment

2.1. Configuration Example

Next, description is given of a mobile body including an information processing apparatus according to a second embodiment of the present disclosure with reference to FIG. 15. FIG. 15 is a block diagram illustrating an example of a functional configuration of a mobile body 2 including an information processing apparatus 11 according to the present embodiment.

As illustrated in FIG. 15, the mobile body 2 includes the sensor section 20 including the plurality of sensors 21 and 22, the information processing apparatus 11 according to the present embodiment, the driving controller 31, and the moving mechanism 32. The information processing apparatus 11 includes a plurality of plane estimating sections 111 and 112, a plurality of coordinate system transforming sections 161 and 162, a cluster group updating section 120A, the object recognizing section 130, the self-position estimating section 140, and the action planning section 150.

It is to be noted that the object recognizing section 130, the self-position estimating section 140, the action planning section 150, the driving controller 31, and the moving mechanism 32 are substantially similar to those described in the first embodiment, and are not described here.

The mobile body 2 including the information processing apparatus 11 according to the present embodiment includes the sensor section 20 including the plurality of sensors 21 and 22 that sense a surrounding environment of the mobile body 2. The sensor section 20 includes the plurality of sensors 21 and 22 that are sensors of the same type or different types, and outputs sensing results of the surrounding environment of the mobile body 2 as pieces of point cloud data. Specifically, the plurality of sensors 21 and 22 may include a distance measurement sensor such as a ultrasonic sensor, a ToF sensor, a RADAR, or a LiDAR sensor, or may include an imaging device such as a stereo camera, a monocular camera, a color camera, an infrared-ray camera, a spectroscopic camera, or a polarization camera. For example, the plurality of sensors 21 and 22 may be a combination of one stereo camera system and one ToF sensor system.

The pieces of point cloud data obtained by the plurality of sensors 21 and 22 are respectively individually clustered by the plane estimating sections 111 and 112, and then transformed into the same coordinate system in the coordinate system transforming sections 161 and 162. In other words, the piece of point cloud data obtained by the sensor 21 is clustered by the plane estimating section 111 to be transformed into a cluster group, and a coordinate system is transformed into a coordinate system in the environment map by the coordinate system transforming section 161. In addition, the piece of point cloud data obtained by the sensor 22 is clustered by the plane estimating section 112 to be transformed into a cluster group, and a coordinate system is transformed into a coordinate system in the environment map by the coordinate system transforming section 162.

Specifically, in order to correct the positions of the sensors 21 and 22 that change with movement of the mobile body 2, the coordinate system transforming sections 161 and 162 each transform position coordinates of each cluster included in a cluster group into relative coordinate to the environment map on the basis of the self-position of the mobile body 2. In addition, in order to correct a difference in reference position between the sensors 21 and 22 mounted at different positions, the coordinate system transforming sections 161 and 162 transform the coordinate systems of the cluster groups based on the respective pieces of point cloud data obtained by the sensors 21 and 22 into the same coordinate system.

According to the coordinate system transforming sections 161 and 162, it is possible to transform even respective pieces of point cloud data obtained by the sensors 21 and 22 that are sensors of different types into the same coordinate system. This makes it possible for the cluster group updating section 120A to sequentially fuse the cluster groups, into which the pieces of point cloud data outputted from the sensor section 20 are clustered, in time series irrespective of the types of sensors included in the sensor section 20.

The cluster group updating section 120A differs from the cluster group updating section 120 described in the first embodiment in that a sequencing section 123 is further included.

The sequencing section 123 rearranges, in time series, the first cluster groups into which the pieces of point cloud data obtained by the sensors 21 and 22 are clustered. Specifically, the sequencing section 123 rearranges the first cluster groups in time series on the basis of a time at which a piece of point cloud data that is the base of the first cluster groups is obtained irrespective of which one of the sensors 21 and 22 obtains the piece of point cloud data. Thus, the determining section 121 and the fusing section 122 in stages subsequent to the sequencing section 123 are able to fuse the first cluster groups reflecting a temporal change of the surrounding environment of the mobile body 2 with the second cluster group in time series.

In the information processing apparatus 11 according to the present embodiment, respective pieces of data of the first cluster groups into which the pieces of point cloud data obtained by the plurality of sensors 21 and 22 are clustered are individually inputted to the cluster group updating section 120A. Accordingly, in the information processing apparatus 11, the sequencing section 123 that rearranges the first cluster groups in time series is provided for the plurality of sensors 21 and 22. Accordingly, the determining section 121 and the fusing section 122 in stages subsequent to the sequencing section 123 are able to update the second cluster group by fusing the first cluster groups with the second cluster group in order rearranged by the sequencing section 123 as described in the first embodiment.

The determining section 121 and the fusing section 122 are substantially similar to those described in the first embodiment, and are not described here.

The information processing apparatus 11 according to the present embodiment is able to reflect all pieces of point cloud data obtained by the plurality of sensors 21 and 22 to the environment map representing the surrounding environment of the mobile body 2, which makes it possible to construct a more highly accurate environment map.

It is to be noted that FIG. 15 illustrates an example in which the sensor section 20 includes two systems of the sensors 21 and 22; however, the technology according to the present embodiment is not limited thereto. The number of sensors included in the sensor section 20 is not specifically limited as long as the number of sensors is two or more.

2.2. Modification Example

Next, description is given of a mobile body including an information processing apparatus according to a modification example of the present embodiment with reference to FIG. 16. FIG. 16 is a block diagram illustrating an example of a functional configuration of a mobile body 2A including an information processing apparatus 11A according to the present modification example.

As illustrated in FIG. 16, in the information processing apparatus 11A according to the present modification example, as in the information processing apparatus 10A according to the modification example of the first embodiment, the self-position estimating section 140A is able to estimate the self-position of the mobile body 2A with higher accuracy by further using the first cluster group and the second cluster group. A specific operation of the self-position estimating section 140A is substantially similar to that in the modification example of the first embodiment, and is not described in detail here.

3. Hardware Configuration Example

In addition, description is given of a hardware configuration of the information processing apparatus 10, 10A, 11, or 11A according to an embodiment of the present disclosure with reference to FIG. 17. FIG. 17 is a block diagram illustrating a hardware configuration example of the information processing apparatus 10, 10A, 11, or 11A according to the present embodiment.

The functions of the information processing apparatus 10, 10A, 11, or 11A according to the present embodiment are implemented by cooperation between software, and hardware described below. For example, the functions of the plane estimating sections 110, 111, and 112, the coordinate system transforming sections 160, 161, and 162, the cluster group updating sections 120 and 120A, the object recognizing section 130, the self-position estimating sections 140 and 140A, and the action planning section 150 described above may be executed by a CPU 901.

As illustrated in FIG. 17, the information processing apparatus 10, 10A, 11, or 11A includes the CPU (Central Processing Unit) 901, a ROM (Read Only Memory) 903, and a RAM (Random Access Memory) 905.

In addition, the information processing apparatus 10, 10A, 11, or 11A may further include a host bus 907, a bridge 909, an external bus 911, an interface 913, an input device 915, an output device 917, a storage device 919, a drive 921, a coupling port 923, and a communication device 925. In addition, the information processing apparatus 10, 10A, 11, or 11A may include, in place of or in addition to the CPU 901, another processing circuit such as a DSP (Digital Signal Processor) or an ASIC (Application Specific Integrated Circuit).

The CPU 901 functions as a computation processor or a controller, and controls the overall operation of the information processing apparatus 10, 10A, 11, or 11A in accordance with various programs recorded in the ROM 903, the RAM 905, the storage device 919, or a removable recording medium 927. The ROM 903 stores a program, computation parameters and the like to be used by the CPU 901. The RAM 905 temporarily stores a program to be used in execution by the CPU 901, parameters to be used in the execution thereof, and the like.

The CPU 901, the ROM 903, and the RAM 905 are mutually coupled by the host bus 907 including an internal bus such as a CPU bus. In addition, the host bus 907 is coupled to the external bus 911 such as a PCI (Peripheral Component Interconnect/Interface) bus via the bridge 909.

The input device 915 is a device that accepts an input from a user, such as a mouse, a keyboard, a touch panel, a button, a switch, or a lever. The input device 915 may be a microphone or the like that detects a voice of a user. In addition, the input device 915 may be, for example, a remote controller utilizing infrared rays or other radio waves, and may be an external coupling apparatus 929 compatible with the operation of the information processing apparatus 10.

The input device 915 further includes an input control circuit that supplies, to the CPU 901, an input signal generated on the basis of information inputted by the user. The user is able to input various pieces of data or give a process operation instruction to the information processing apparatus 10, 10A, 11, or 11A by operating the input device 915.

The output device 917 is a device that is able to visually or audibly present information obtained or generated by the information processing apparatus 10, 10A, 11, or 11A to the user. The output device 917 may be, for example, a display device such as an LCD (Liquid Crystal Display), a PDP (Plasma Display Panel), an OLED (Organic Light Emitting Diode) display, a hologram, or a projector. Further, the output device 917 may be a sound output device such as a speaker or a headphone, or may be a printing device such as a printer. The output device 917 may output information obtained by the process of the information processing apparatus 10, 10A, 11, or 11A as an image such as a text or a picture, or a sound such as a voice or an acoustic sound.

The storage device 919 is a data storage device configured as an example of a storage section of the information processing apparatus 10, 10A, 11, or 11A. The storage device 919 may include, for example, a magnetic storage device such as an HDD (Hard Disk Drive), a semiconductor storage device, an optical storage device, a magneto-optical storage device, or the like. The storage device 919 is able to store a program to be executed by the CPU 901, various pieces of data, various pieces of data obtained from outside, and the like.

The drive 921 is a reading or writing device for the removable recording medium 927 such as a magnetic disk, an optical disk, a magneto-optical disk, or a semiconductor memory. The drive 921 is built in or externally attached to the information processing apparatus 10, 10A, 11, or 11A. For example, the drive 921 is able to read information recorded in the mounted removable recording medium 927 and supply the information to the RAM 905. Further, the drive 921 is able to write a record in the mounted removable recording medium 927.

The coupling port 923 is a port for directly coupling the external coupling apparatus 929 to the information processing apparatus 10, 10A, 11, or 11A. The coupling port 923 may be, for example, a USB (Universal Serial Bus) port, an IEEE1394 port, an SCSI (Small Computer System Interface) port, or the like. Further, the coupling port 923 may be an RS-232C port, an optical audio terminal, an HDMI (registered trademark) (High-Definition Multimedia Interface) port, or the like. The coupling port 923 is able to perform transmission and reception of various pieces of data between the information processing apparatus 10, 10A, 11, or 11A and the external coupling apparatus 929 by being coupled to the external coupling apparatus 929.

The communication device 925 is, for example, a communication interface including a communication device for coupling to the communication network 931. The communication device 925 may be, for example, a wired or wireless LAN (Local Area Network), Bluetooth (registered trademark), a communication card for WUSB (Wireless USB), or the like. Further, the communication device 925 may be a router for optical communication, a router for ADSL (Asymmetric Digital Subscriber Line), a modem for various types of communication, or the like.

For example, the communication device 925 is able to perform transmission and reception of a signal or the like with the Internet or another communication apparatus with use of a predetermined protocol such as TCP/IP. The communication network 931 coupled to the communication device 925 may be a network coupled with or without a wire. The communication network 931 may be, for example, an Internet communication network, a domestic LAN, an infrared-ray communication network, a radio wave communication network, a satellite communication network, or the like.

It is to be noted that it is also possible to create a program for causing the hardware built in the computer such as the CPU 901, the ROM 903, and the RAM 95 to exhibit functions equivalent to those of the information processing apparatus 10, 10A, 11, or 11A described above. Further, it is also possible to provide a recording medium in which such a program is recorded and that is readable by the computer.

Although the technology according to the present disclosure has been described above with reference to the first and second embodiments and the modification examples. However, the technology according to the present disclosure is not limited to the embodiments and the like described above, and may be modified in a variety of ways. For example, the technology according to the present disclosure is applicable not only to a route plan in a three-dimensional space environment map but also to a route plan in a two-dimensional plane environment map.

Further, not all of the configurations and operations described in the respective embodiments are indispensable as the configurations and operations of the present disclosure. For example, among the components in the respective embodiments, components not described in the independent claim indicating the most significant concepts of the present disclosure are to be understood as optional components. In other words, it is sufficient if the information processing apparatuses according to the first and second embodiments of the present disclosure each include at least the fusing section.

Terms used throughout this specification and the appended claims should be construed as "non-limiting" terms. For example, the term "including" or "included" should be construed as "not limited to what is described as being included". The term "having" should be construed as "not limited to what is described as being had".

The terms used herein are used merely for the convenience of description and include terms that are not used to limit the configuration and the operation. For example, the terms such as "right", "left", "up", and "down" only indicate directions in the drawings being referred to. In addition, the terms "inside" and "outside" only indicate a direction toward the center of a component of interest and a direction away from the center of a component of interest, respectively. The same applies to terms similar to these and to terms with the similar purpose.

It is to be noted that the technology according to the present disclosure may have the following configurations. According to the technology according to the present disclosure having the following configurations, for example, sequentially fusing cluster groups into which a piece of point cloud data obtained by a sensor is clustered with a cluster group generated in the past in time series, which makes it possible to sequentially update cluster groups corresponding to microplane groups of an object surface present in a surrounding environment. Thus, the technology according to the present disclosure makes it possible to update an environment map representing a surrounding environment with higher efficiency. Effects exerted by the technology according to the present disclosure are not necessarily limited to the effects described here, and may be any of the effects described in the present disclosure.

(1)

An information processing apparatus including
a fusion section that fuses each of first clusters included in a first cluster group with each of second clusters included in a second cluster group to update the second cluster group, the first cluster group into which a piece of first point cloud data obtained by a sensor is clustered, and the second cluster group generated on the basis of a piece of second point cloud data obtained earlier than the piece of first point cloud data.

(2)

The information processing apparatus according to (1), in which the fusing section fuses each of the first clusters with each of the second clusters on the basis of at least one of shapes of the first clusters and the second clusters, a weight based on number of point clouds in pieces of point cloud data used for generation of the first clusters and the second clusters, or reliability of the sensor upon obtaining the piece of first point cloud data and the piece of second point cloud data.

(3)

The information processing apparatus according to (2), in which
the first clusters and the second clusters each have a shape of an oblate ellipsoid, and the fusing section fuses each of the first clusters with each of the second clusters on the basis of a normal direction with respect to a partial plane of the oblate ellipsoid and a thickness in the normal direction of the oblate ellipsoid.

(4)

The information processing apparatus according to (3), in which the fusing section estimates shapes of the first clusters and the second clusters as fusion targets on the basis of a Kalman filter.

(5)

The information processing apparatus according to any one of (1) to (4), further including a determining section that determines each of the second clusters as a fusion target with respect to each of the first clusters.

(6)

The information processing apparatus according to (5), in which
the first clusters and the second clusters each have a shape of an oblate ellipsoid, and
the determining section determines each of the second clusters as a fusion target with respect to each of the first clusters on the basis of a distance and angle in a normal direction to a partial plane of the oblate ellipsoid and a distance in a direction of the partial plane of the oblate ellipsoid.

(7)

The information processing apparatus according to any one of (1) to (6), in which
the piece of first point cloud data is obtained by each of a plurality of sensors, and
the fusing section sequentially fuses a plurality of the first cluster groups into which the pieces of first point cloud data obtained by the plurality of sensors are clustered with the second cloud group in time series.

(8)

The information processing apparatus according to (7), in which the plurality of sensors includes sensors of a same type or different types.

(9)

The information processing apparatus according to (7) or (8), in which a plurality of the first cluster groups is coordinate-transformed into a same coordinate system.

(10)

The information processing apparatus according to any one of (1) to (9), in which
the sensor is mounted on a mobile body of which an action plan is created on the basis of an environment map, and
the information processing apparatus further includes a coordinate system transforming section that transforms position coordinates of the first cluster included in the first cluster group into relative coordinates to the environment map.

(11)

The information processing apparatus according to (10), further including a self-position estimating section that estimates a self-position of the mobile body, in which
the coordinate transforming section transforms the position coordinates of the first cluster into the relative coordinate to the environment map on the basis of the estimated self-position of the mobile body.

(12)

The information processing apparatus according to (11), in which the self-position estimating section estimates the self-position of the mobile body on the basis of the first cluster and the second cluster.

(13)

The information processing apparatus according to any one of (1) to (12), in which the fusing section discards the second cluster that is not fused with the first cluster for a predetermined period or longer among the second clusters included in the second cluster group to update the second cluster group.

(14)

The information processing apparatus according to any one of (1) to (13), in which the first point cloud data and the second point cloud data each include data representing a three-dimensional space.

(15)

The information processing apparatus according to any one of (1) to (14), in which the first cluster group is generated by clustering a partial point cloud into which a point cloud included in the piece of first point cloud data is divided until the partial point cloud does not satisfy a predetermined division condition.

(16)

The information processing apparatus according to (15), in which the predetermined division condition includes at least one of a condition about number of points included in the point cloud, a condition about a size of a region surrounding the point cloud, a condition about density of points included in the point cloud, or a condition about a shape of the point cloud.

(17)

The information processing apparatus according to (15) or (16), in which the first cluster group is generated by clustering only the partial point cloud satisfying a predetermined clustering condition.

(18)

The information processing apparatus according to (17), in which the predetermined clustering condition includes at least one of a condition about number of points included in the point cloud, a condition about a size of a region surrounding the point cloud, a condition about density of points included in the point cloud, or a condition about a shape of the point cloud.

(19)

An information processing method including:
with use of a calculation processor,
fusing each of first clusters included in a first cluster group with each of second clusters included in a second cluster group to update the second cluster group, the first cluster group into which a piece of first point cloud data obtained by a sensor is clustered, and the second cluster group generated on the basis of a piece of second point cloud data obtained earlier than the piece of first point cloud data.

(20)

A program causing a computer to function as
a fusion section that fuses each of first clusters included in a first cluster group with each of second clusters included in a second cluster group to update the second cluster group, the first cluster group into which a piece of first point cloud data obtained by a sensor is clustered, and the second cluster group generated on the basis of a piece of second point cloud data obtained earlier than the piece of first point cloud data.

This application claims the priority on the basis of Japanese Patent Application No. 2020-118065 filed on Jul. 8, 2020 with Japan Patent Office, the entire contents of which are incorporated in this application by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. An information processing apparatus, comprising:
a fusion section configured to:
fuse a plurality of first clusters of a first cluster group with a plurality of second clusters of a second cluster group, wherein
each of the plurality of first clusters has a shape of an oblate ellipsoid,
each of the plurality of second clusters has a shape of the oblate ellipsoid,
the fusion of the plurality of first clusters with the plurality of second clusters is based on a normal direction of the oblate ellipsoid and a thickness in the normal direction of the oblate ellipsoid,
the normal direction corresponds to a partial plane of the oblate ellipsoid,
the first cluster group includes a piece of first point cloud data obtained by a sensor, and
the second cluster group includes a piece of second point cloud data obtained by the sensor prior to the piece of first point cloud data; and
update the second cluster group based on the fusion.

2. The information processing apparatus according to claim 1, wherein
the fusing section is further configured to fuse the plurality of first clusters with the plurality of second clusters based on at least one of the shape of each of the plurality of first clusters, the shape of each of the plurality of second clusters, a cluster weight, or a reliability of the sensor to obtain the piece of first point cloud data and the piece of second point cloud data, the cluster weight corresponds to a number of point clouds in a plurality of pieces of point cloud data for generation of the plurality of first clusters and the plurality of second clusters, the plurality of pieces of point cloud data includes the piece of first point cloud data and the piece of second point cloud data.

3. The information processing apparatus according to claim 1, wherein the fusing section is further configured to estimate, based on a Kalman filter, the shape of each of the plurality of first clusters and the shape of each of the plurality of second clusters, and the plurality of first clusters and the plurality of second clusters correspond to fusion targets.

4. The information processing apparatus according to claim 1, further comprising a determining section configured to determine a second cluster of the plurality of second clusters as a fusion target for a first cluster of the plurality of first clusters.

5. The information processing apparatus according to claim 4, wherein the determining section is further configured to determine the second cluster as the fusion target for the first cluster based on a first distance between the first cluster and the second cluster in the normal direction, an angle between the first cluster and the second cluster in the normal direction, and a second distance between the first cluster and the second cluster in a direction of the partial plane of the oblate ellipsoid.

6. The information processing apparatus according to claim 1, wherein the piece of first point cloud data is obtained by each of a plurality of sensors, the fusing section is further configured to sequentially fuse, in time series, a plurality of the first cluster group with the second cluster group, the plurality of the first cluster group includes the piece of first point cloud data corresponding to each of the plurality of sensors, and the plurality of sensors includes the sensor.

7. The information processing apparatus according to claim 6, wherein each of the plurality of sensors is one of a same type or a different type.

8. The information processing apparatus according to claim 6, further comprising a transforming section configured to transform coordinates of each of the plurality of the first cluster group to a same coordinate system.

9. The information processing apparatus according to claim 1, further comprising:

an object recognizing section configured to construct an environment map for a mobile body, wherein the sensor is on the mobile body;

an action planning section configured to create an action plan based on the constructed environment map; and a coordinate system transforming section configured to transform position coordinates of a first cluster to relative coordinates of the constructed environment map, wherein the plurality of first clusters includes the first cluster.

10. The information processing apparatus according to claim 9, further comprising a self-position estimating section configured to estimate a self-position of the mobile body, wherein the coordinate system transforming section is further configured to transform, based on the estimated self-position of the mobile body, the position coordinates of the first cluster to the relative coordinates of the environment map.

11. The information processing apparatus according to claim 10, wherein the self-position estimating section is further configured to estimate the self-position of the mobile body based on the first cluster and a second cluster of the plurality of second clusters.

12. The information processing apparatus according to claim 1, wherein the fusing section is further configured to:

discard a second cluster of the plurality of second clusters that is not fusible with a first cluster of the plurality of first clusters for greater than or equal to a specific period of time; and update the second cluster group based on the discarded second cluster.

13. The information processing apparatus according to claim 1, wherein each of the piece of first point cloud data and the piece of second point cloud data comprises a piece of data that represents a three-dimensional space.

14. The information processing apparatus according to claim 1, further comprising a plane estimating section configured to:

divide a point cloud of the piece of first point cloud data based on a specific division condition;

generate a plurality of partial point clouds based on the division of the piece of first point cloud data;

perform a clustering process on the generated plurality of partial point clouds; and generate the first cluster group based on the performed clustering process on the plurality of partial point clouds.

15. The information processing apparatus according to claim 14, wherein the specific division condition includes at least one of a condition associated with a number of points of the point cloud, a condition associated with a size of a region that surrounds the point cloud, a condition associated with a density of points in the point cloud, or a condition associated with a shape of the point cloud.

16. The information processing apparatus according to claim 14, wherein the plane estimating section is further configured to perform the clustering process on the plurality of partial point clouds based on a specific clustering condition.

17. The information processing apparatus according to claim 16, wherein the specific clustering condition includes at least one of a condition associated with a number of points in the point cloud, a condition associated with a size of a region that surrounds the point cloud, a condition associated with a density of points in the point cloud, or a condition associated with a shape of the point cloud.

18. An information processing method, comprising:

in a calculation processor fusing a plurality of first clusters of a first cluster group with a plurality of second clusters of a second cluster group, wherein each of the plurality of first clusters has a shape of an oblate ellipsoid, each of the plurality of second clusters has a shape of the oblate ellipsoid, the fusion of the plurality of first clusters with the plurality of second clusters is based on a normal direction of the oblate ellipsoid and a thickness in the normal direction of the oblate ellipsoid, the normal direction is corresponding to a partial plane of the oblate ellipsoid, the first cluster group includes a piece of first point cloud data obtained by a sensor, and the second cluster group includes a piece of second point cloud data obtained by the sensor prior to the piece of first point cloud data; and updating the second cluster group based on the fusion.

19. A non-transitory computer-readable medium having stored thereon, computer-executable instructions which, when executed by a computer, cause the computer to execute operations, the operations comprising:

fusing a plurality of first clusters of a first cluster group with a plurality of second clusters of a second cluster group, wherein each of the plurality of first clusters has a shape of an oblate ellipsoid, each of the plurality of second clusters has a shape of the oblate ellipsoid, the fusion of the plurality of first clusters with the plurality of second clusters is based on a normal direction of the oblate ellipsoid and a thickness in the normal direction of the oblate ellipsoid, the normal direction is corresponding to a partial plane of the oblate ellipsoid, the first cluster group includes a piece of first point cloud data obtained by a sensor, and the second cluster group includes a piece of second point cloud data obtained by the sensor prior to the piece of first point cloud data; and updating the second cluster group based on the fusion.

* * * * *